United States Patent [19]

Huwe

[11] 4,300,469
[45] Nov. 17, 1981

[54] DROP MARKER

[76] Inventor: Maurice K. Huwe, Box 583, Waitsburg, Wash. 99361

[21] Appl. No.: 3,209

[22] Filed: Jan. 15, 1979

[51] Int. Cl.³ .............................................. B64D 1/02
[52] U.S. Cl. .................................................. 116/209
[58] Field of Search .................... 116/209; 340/24, 25; 150/39; 428/486, 487, 907, 314, 2

[56] References Cited

U.S. PATENT DOCUMENTS

| | | | |
|---|---|---|---|
| 2,744,557 | 8/1956 | Link | 150/39 |
| 2,791,518 | 5/1957 | Stokes | 428/907 |
| 3,428,019 | 2/1969 | Tillay et al. | 116/209 |
| 3,470,846 | 10/1969 | Tillay et al. | 116/209 |
| 3,973,513 | 8/1976 | Huwe | 116/209 |
| 4,128,529 | 12/1978 | Becker | 428/907 |

Primary Examiner—Charles A. Ruehl
Assistant Examiner—Denis E. Corr
Attorney, Agent, or Firm—Thomas W. Secrest

[57] ABSTRACT

This invention is directed for a marker which can be dropped from an airplane so that the pilot of an airplane can see the marker on the ground and know, when he is in the airplane, where the airplane has flown for spraying fertilizer, insecticides, herbicides, and the like. The drop marker comprises two base members and a folded streamer strip of attached at each end to a base member. The drop marker unfolds when falling from the airplane toward the ground. The drop marker, upon reaching the ground and with the streamer strip unfolded, makes it possible for the pilot of the airplane to know where he has sprayed the chemical carried by the airplane.

10 Claims, 10 Drawing Figures

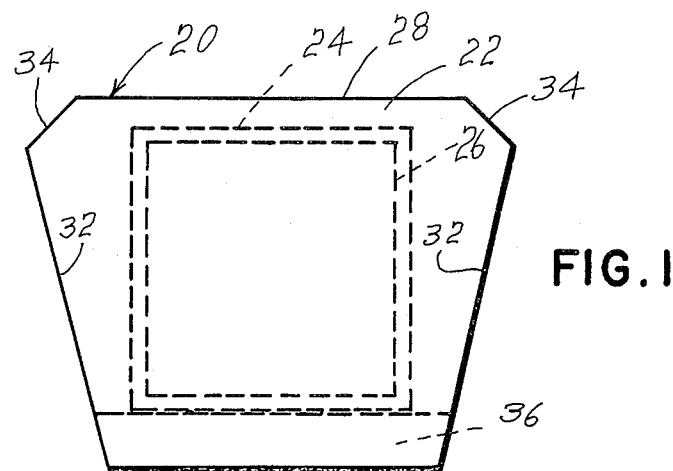
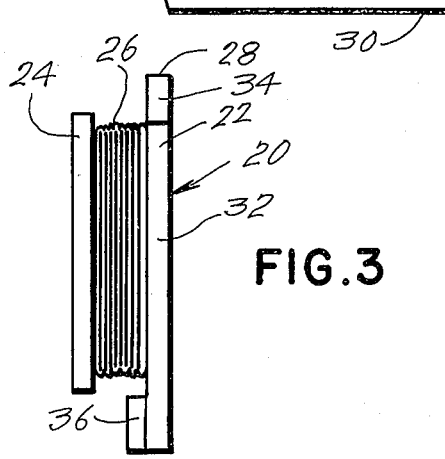
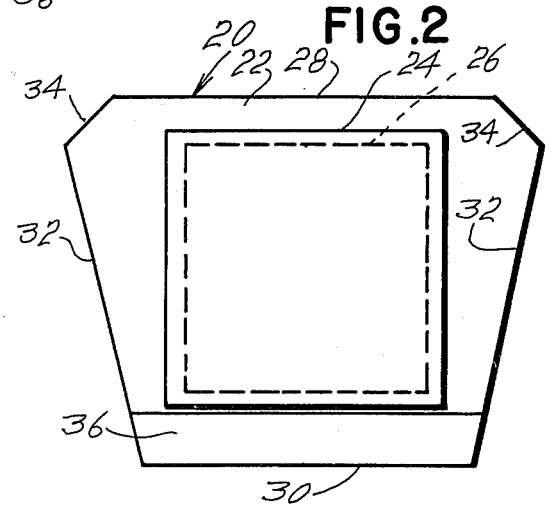
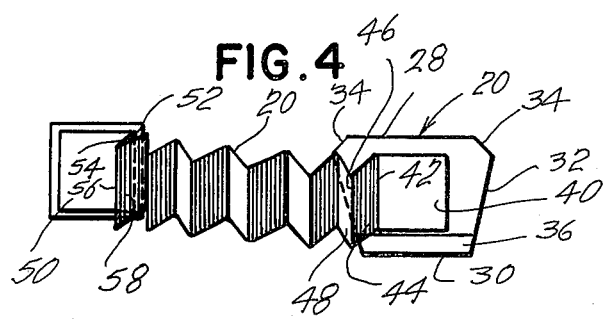
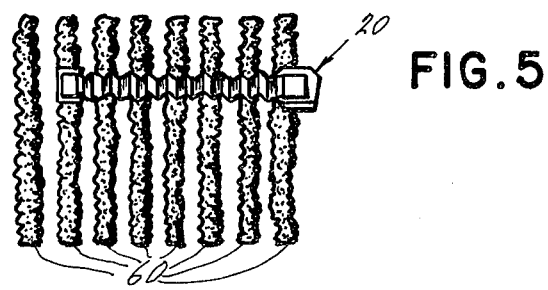

DROP MARKER

A BRIEF SUMMARY OF THE INVENTION

This invention is a drop marker and comprises two base members and a streamer strip which is attached to each of the two base members. The marker is heavier than air. The base members and the streamer strip are heavier than air.

When the pilot of the airplane releases a drop marker the drop marker falls to the ground and the two base members separates so as to pull the streamer strip or to unfold and expand the streamer strip.

With the drop marker lying on the ground or on the area which has been sprayed with chemicals and the base members lying on the ground or the area which has been sprayed with chemicals, the pilot of the airplane can see the streamer strip. The streamer strip may be on the ground or may be lying on top of some object such as growing material like crops and trees. With the pilot of the airplane being able to see the streamer strip the pilot knows the areas which have been sprayed with the chemical from the airplane and which areas have not been sprayed with the chemical.

THE DRAWINGS

FIG. 1 is a front elevational view of a first species of the drop marker and illustrates in solid line a first base member, in phantom line a second base member and in phantom line a streamer strip;

FIG. 2 is a rear elevational view of the drop marker and illustrates in solid line the second base member, the reinforcing plate or weighted member, in phantom line the streamer strip and in solid line the first base member;

FIG. 3 is a side elevational view of the drop marker and illustrates a first base member, the second base member and the folded streamer strip;

FIG. 4 is a view illustrating the drop marker in an expanded or, unfolded, configuration and illustrates the first base member, the second base member and the streamer strip;

FIG. 5 is a view, of schematic illustration, looking at the drop marker in an expanded state and with the streamer strip over rows of growing crops;

THE DETAILED DESCRIPTION OF THE INVENTION

Figure 6:
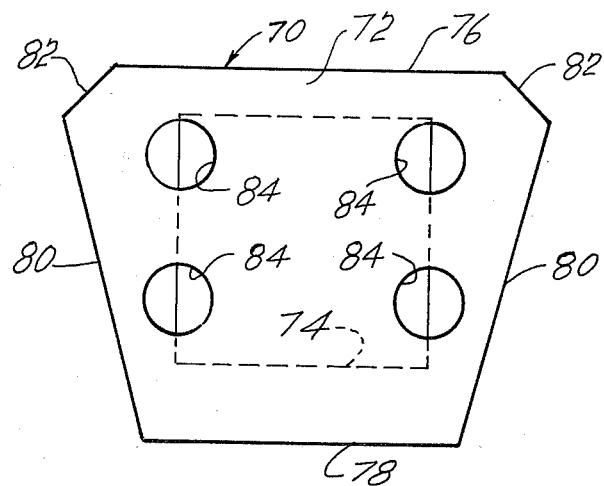
FIG. 6 is a front elevational view of another species of the drop marker and illustrates a base member with holes in the base member and also illustrates, in phantom, the streamer strip.

For a number of years, airplanes have been used for spraying chemicals onto land. For example, airplanes have been used for spraying fertilizer, insecticides, herbicides and the like on farm land. Also, airplanes have been used for spraying insecticides and herbicides on grazing land and on forest land to control the tussock moth. With the spraying of these chemicals onto land, it is necessary for the airplane pilot to know where the chemicals have been sprayed and to know where the chemicals have not been sprayed. To know the demarcation between these two areas, it is necessary to have an indicator. A satisfactory indicator is a drop marker which can be dropped from an airplane and which as an identifying portion or member which can be seen by the pilot in the airplane when the drop marker is on the ground or overgrowing crops or hanging from a tree in a forested area.

The drop marker should be, relatively, inexpensive as the drop marker is used, only, once and a large number of drop markers are used by airplane pilots in the spraying of chemicals onto the farm land, range land, and forests.

I am the inventor of an invention entitled, "Drop Marker", U.S. Pat. No. 3,973,513, issuing date of Aug. 10, 1976. The drop marker of this invention is suitable in many instances for indicating where an area has been sprayed with chemicals and where an area has not been sprayed with chemicals. However, in some instances this drop marker is not, always, satisfactory. For example, a tall crop such as corn, sorghum, sun flowers and, even, trees the drop marker with one base member and one streamer strip may fall so as to be between rows of the corn or sorghum or sun flowers and may not be, readily, visible by the pilot of the airplane. I have been in a position to know that a number of these drop markers have been manufactured and sold. Also, I know that one of the short comings is that this type of drop marker does fall between rows of corn, sorghum and sun flowers so as not to be, readily, visible by the pilot of the airplane. Further, these immediate above comments are also applicable to the drop marker of U.S. Pat. No. 3,428,019, issuing date of Feb. 18, 1969, in the name of D. Tillay Et Al.

With this background of having manufactured and sold drop markers and knowing one of the short comings of these drop markers I have made the present invention for a drop marker and this invention comprises a first base member, a second base member and a streamer strip connected on one end of the first base member and on the other end of the second base member. With the drop marker of this present invention there is less possibility of the drop marker falling between the rows of corn or sorghum or sun flowers or trees so as to not be, readily, visible by the pilot of the airplane.

In FIGS. 1 through 5, there is illustrated a first species of a drop marker 20.

The drop marker 20 comprises a first base member 22 in the general configuration of a trapezoid, a second base member 24 in the configuration of a square and a streamer strip 26.

The first base member 22 may have a top edge 28, a parallel bottom edge 30, two outwardly directed sides 32 connecting with the bottom edge 30, and two inwardly directed sides 34 connecting the top edge 28 with the sides 32.

There may be a reinforcing plate 36 along the bottom edge 30. The reinforcing plate 36 may be a weighted member.

In FIG. 4 it is seen that there is a streamer strip 38. The streamer strip comprises a base pleat 40 connected to the first base member 22. Then, there is a fold 42 between the base pleat 40 and the second pleat 44. Then, there is a fold 46 between the second pleat 44 and the third pleat 48.

On the second base member 24 there is a base pleat 50. The base pleat 50 connects with a fold 52 which connects with a pleat 54. The pleat 54 connects with the fold 56 which connects with a pleat 58. The streamer 38 may have a number of pleats and folds between the first base member 22 and the second base member 24.

The first member 22, the second base member 24 and the reinforcing plate may be made of any reasonable material. The cost of material may play an important feature. For example, the base members and the reinforcing plate may be made of flexible corrugated board or paper board. Flexible corrugated board is well known and is used in packing boxes. Paper board is also well known and is also known as cardboard. Paper board is compressed paper and is readily found in the back of tablets as the reinforcing material for paper tablets and also the writing base for paper tablets. Paper board is also used in the making of the guitar cases.

In FIG. 5 there is illustrated the drop marker 20 as spread across rows 60 of crops. The crops in the rows 60 may be corn of four, five or six feet in height, sorghum which may be five, six or seven feet in height, sun flowers which may be four, five, six or seven feet in height and, even, trees. The airplane pilot has sprayed the area with chemicals as insecticides, herbicides, fertilizer and the like. The expanded and unfolded drop marker 20 indicates to the pilot of the airplane where he has sprayed.

In FIG. 3 there is illustrated a side elevational view of the drop marker 20 and this view shows a streamer strip 26 in a folded state and which can be identified as a folded streamer strip. The folded streamer strip 26 is compressed between the primary base 22 and the secondary base member 24.

The drop marker 20 is heavier than air and when released from the airplane falls to the ground.

In FIGS. 6 through 8 and 10 there is illustrated a second drop marker 70. The drop marker 70 comprises two spaced apart base members 72. Each of the base members 72 have a top edge or an upper edge 76 and a lower edge 78. The lower edge 78 connects with two outwardly directed sides 80. The upper part of each side 80 connects by means of a side 82 to the top edge 76. A streamer strip 74 connects the two base members 72. In FIG. 6 and in FIG. 8 it is seen that the base members 72 are of a general trapezoidal configuration. In the base members 72 there may be passageways 84. In FIG. 6 it is seen that there are four passageways 84.

Figure 7:
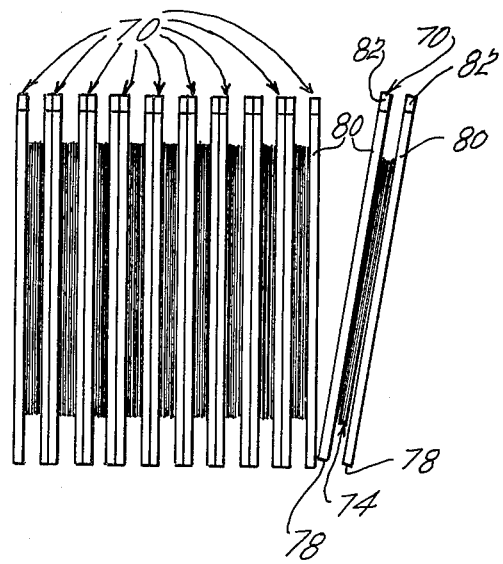
FIG. 7 is a side elevational view of a number of drop markers as positioned in a cannister ready for release and dropping to the ground.

In FIG. 7 it is seen that there are a plurality of drop markers 70 arranged in a back-to-back relationship as they appear in a cannister ready to be discharged so as to fall from the airplane and to the ground.

Figure 8:
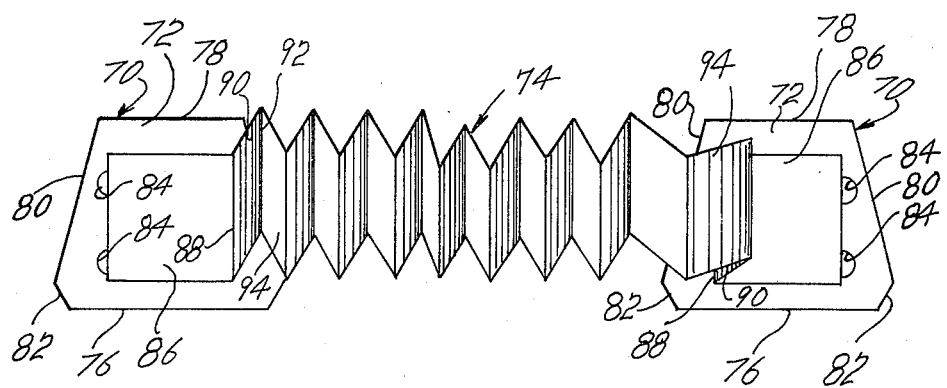
FIG. 8 is a view illustrating a second species of a drop marker with the first base member and the second base member and the streamer strip connecting with the first base member and the second base member and with the drop marker in an expanded or, unfolded, configuration.

In FIG. 8 it is seen that there is attached to the base member 72 a base pleat 86. There is a fold 88 which connects with the base pleat 86 and also connects with a pleat 90. Then, there is a fold 92 which connects with the pleat 94. Likewise, on the other end of the streamer strip 74 there is a base pleat 86 which connects with the base member 72. There is a fold 88 between the base pleat 86 and the pleat 90. Then, there is a fold 92 between the pleat 90 and the pleat 94. There may be a number of pleats and folds in the streamer strip 74.

Figure 9:
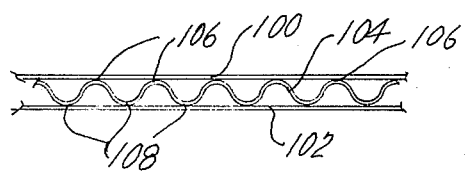
FIG. 9 is an end view of a base member and illustrates the flexible, corrugated board comprising the base member and a flexible, corrugated board comprises a corrugated sheet, and a first base sheet of one of the corrugated sheets and the other base sheet of the other part of the corrugated sheets; and, FIG. 10 is a side elevational view of the second species of the drop marker.
Figure 10:
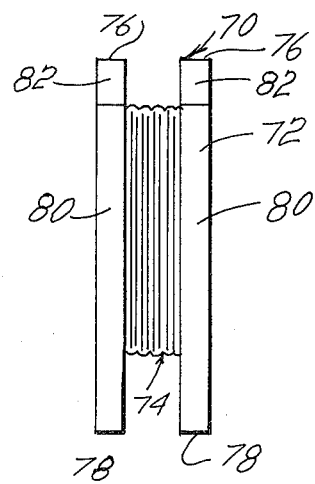

In FIG. 7 it is seen that the streamer strip 74 is a folded streamer strip. In FIG. 9 it is seen that the streamer strip 74 is an expanded or unfolded streamer strip.

Again, the base members 72 may be of flexible corrugated board or paper board. The streamer strips 26 and 74 may be of a suitable material such as thin paper of tissue paper or a like paper.

It is seen that in the base member 72 of the drop marker 70 that there may be a plurality of holes or passageways 84. The base pleat 86 of the streamer strip 74 covers part of these holes or passageways 84. One reason for the holes or passageways 84 is that when the drop marker is ejected from the cannister holding the drop markers that the wind or air will pass through the holes 84 and assist in unfolding the drop marker and the streamer strip 74.

If corrugated board is used for the base members it is seen, in FIG. 9, that the corrugated board comprises a first facing sheet 100 a second facing sheet 102 and a corrugated sheet 104. The first facing sheet 100 is glued or adhered to the corrugated sheet 104 at areas 106. Likewise, the second facing sheet 102 is glued or adhered to the corrugated sheet 104 at areas 108. The result is a flexible, corrugated board which is used as a base member for the drop marker.

The base members and the streamer strip may be made of various materials. It is possible to make the base members and the streamer strips of plastic or of fibrous material. A desirable fibrous material is cellulose which is, commonly, available. The structure of the base members and the reinforcing plate has been previously described. The streamer strip may be commercial tissue paper of a quality and thickness similar to facial tissue.

It is desirable that the base members and the streamer strip disintegrate upon being exposed to the elements, such as water, sunshine, wind, and the action of bacteria in the earth. Therefore, it is desirable that the drop marker be made of cellulose fibers which are, readily, available from wood. The adhesive for bonding together the base pleats of the streamer strip to the base members of the drop marker may be a urea based adhesive. Such an adhesive also functions as a fertilizer with the distintegration of the drop marker.

From the foregoing it is seen that I have provided a drop marker which can be dropped from an airplane and the drop marker upon landing on growing crops or on the ground or being hung up in a tree can been visually seen by the airplane pilot while the pilot is flying the airplane. Also, the drop marker of this invention is inexpensive to manufacture and to package for dropping from an airplane. To repeat, the drop marker is used once. Therefore, it is desirable that the drop marker be inexpensive to manufacture and to also be inexpensive to handle. Further, the drop marker of this invention can be used with existing ejection equipment provided for other drop markers and, in particular, the ejection equipment of U.S. Pat. No. 3,470,846, issuing date of Oct. 7, 1969 to D. Tillay Et Al. In addition, the drop marker of this invention will disintegrate upon being exposed to the elements such as water, air, sun, wind, and the bacterial action in the earth and also in the crops. Finally, the drop marker of this invention does not become a pollutant as it does disintegrate and if, made from cellulose fibers, can be recycled into the chemical and physical processes of the earth.

In preparing this patent application I did not make a patent search. One of the reasons for not making the patent search was that I am the holder of U.S. Pat. No. 3,973,513 issuing date of Aug. 10, 1976 and, further, I am familiar with this subject matter. Previously, in this specification, I have discussed my patent and also the patent of D. Tillay Et Al, U.S. Pat. No. 3,428,019, issuing date of Feb. 18, 1969, and have stated the reasons I think this subject invention distinguishes over these two patents.

I know of the following patents and consider that the subject invention distinguishing over these patents:

| PATENT NO: | INVENTOR: | DATE ISSUED: |
|---|---|---|
| 1,564,152 | J. M. Thomson | Dec. 1, 1925 |
| 1,798,052 | F. Addition | Mar. 24, 1931 |
| 1,805,002 | F. Neumeyer | May 12, 1931 |
| 1,985,678 | L. T. Hand | Dec. 25, 1934 |
| 2,149,530 | L. Loweth | Mar. 7, 1939 |
| 2,183,540 | D. H. Campbell | Dec. 19, 1939 |
| 2,134,987 | N. N. Shorb | Nov. 1, 1938 |
| 2,238,875 | F. G. Manson | Apr. 15, 1941 |
| 2,349,984 | R. K. Ostrander | May 30, 1944 |
| 2,360,516 | G. T. Schmidling | Oct. 17, 1944 |
| 2,474,523 | Guyer | 6/1949 |
| 2,589,045 | Brooks | 3/1952 |
| 2,610,868 | M. Flament | 9/1952 |
| 2,646,786 | Robertson | 7/1953 |
| 2,800,099 | Baker | 7/1957 |
| 2,825,803 | L. Newbrough | Mar. 4, 1958 |
| 2,949,094 | F. H. Clothier | Aug. 16, 1960 |
| 3,059,362 | J. Scherotto | Oct. 23, 1962 |
| 3,081,907 | Scerbo | 3/1963 |
| 3,094,266 | Hoff | 6/1963 |
| 3,164,801 | Nicholl | 1/1965 |
| 3,199,764 | Oliver | 8/1965 |
| 3,280,549 | Jui-Cheng Hsu | Oct. 25, 1966 |
| 3,322,093 | Goland et al. | 5/1967 |
| 3,360,728 | Stevinson et al. | 12/1967 |
| 3,428,019 | D. Tillay et al. | Feb. 18, 1969 |
| 3,470,846 | D. Tillay et al. | Oct. 7, 1969 |
| 3,885,729 | Rous | 5/1975 |
| 3,973,513 | Huwe | Aug. 10, 1976 |

From the foregoing and having presented my invention, what I claim is:

1. A drop marker for use in marking ground areas from an airplane, said drop marker comprising:
   a. a first base member;
   b. a second base member;
   c. a folded streamer strip of soft flexible material having a large surface area and a first end and a second end;
   d. said first end of said folded streamer strip affixed to said first base member and said second end of said folded streamer strip affixed to said second base member;
   e. said first base member and said second base member being spaced apart and separated by said folded streamer strip;
   f. whereby when the marker is dropped from an airplane said base members separate thereby causing said folded streamer strip to unfold and stream between said base members; and,
   g. the configurations of said first base member and said second base member being different.

2. A drop marker according to claim 1 comprising:
   a. a reinforcing plate attached to said first base member near an exposed edge portion to stiffen said first base member at said portion and to cause an unbalance in the weight distribution of said first base member.

3. A drop marker according to claim 1 and comprising:
   a. said folded streamer strip lying wholly within the border of the first base member to provide exposed edge portions on said first base member and thereby facilitate separation of one marker from a plurality of markers.

4. The drop marker of claim 1 wherein the base member, reinforcing plate and the streamer strip are all composed of biodegradable material.

5. The drop marker of claim 4 wherein the biodegradable material comprises vegetable fibers.

6. The drop marker of claim 1 having holes within said first base member relatively near the edge portions of said first base member.

7. The drop marker of claim 6 wherein the folded streamer strip in folded condition overlays the holes, at least, in part.

8. A drop marker for use in marking ground areas from an airplane, said drop marker comprising:
   a. a first base member;
   b. a second base member;
   c. a folded streamer strip of soft flexible material having a large surface area and a first end and a second end;
   d. said first end of said folded streamer strip affixed to said first base member and said second end of said folded streamer strip affixed to said second base member;
   e. said first base member and said second base member being spaced apart and separated by said folded streamer strip;
   f. whereby when the marker is dropped from an airplane said base members separate thereby causing said folded streamer strip to unfold and stream between said base members.
   g. the configurations of said first base member and said second base member being, substantially, the same; and,
   h. said folded streamer strip lying wholly within the border of the first base member to provide exposed edge portions on said first base member to provide and thereby facilitate separation of one marker from a plurality of markers.

9. A drop marker for use in marking ground areas from an airplane, said drop marker comprising:
   a. a first base member;
   b. a second base member;
   c. a folded streamer strip of soft flexible material having a large surface area and a first end and a second end;
   d. said first end of said folded streamer strip affixed to said first base member and said second end of said folded streamer strip affixed to said second base member;
   e. said first base member and said second base member being spaced apart and separated by said folded streamer strip;
   f. whereby when the marker is dropped from an airplane said base members separate thereby causing said folded streamer strip to unfold and stream between said base members;
   g. the configurations of said first base member and said second base member being, substantially, the same; and,
   h. the drop marker having holes within said first base member relatively near the edge portions of said base member.

10. The drop marker of claim 9 wherein the folded streamer strip in folded condition overlays the holes, at least, in part.

* * * * *